United States Patent Office 3,174,843
Patented Mar. 23, 1965

3,174,843
NORBORNYL-1,1-DIMETHYL UREAS AND THIO-
UREAS AND USE AS HERBICIDES
George A. Buntin, Wilmington, and William R. Diveley,
Newark, Del., assignors to Hercules Powder Company,
Wilmington, Del., a corporation of Delaware
No Drawing. Filed May 1, 1962, Ser. No. 191,451
16 Claims. (Cl. 71—2.6)

This invention relates to new compositions of matter and more particularly to compositions for controlling growth of undesired plants and to methods of utilizing such compositions.

Herbicidally active compounds of the present invention are represented by the structural formula

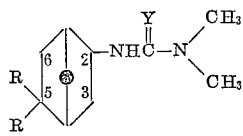

in which the R substituents represent methyl, halogen, or halomethyl where the halogen has an atomic number not greater than 35 and Y represents oxygen or sulfur. The R substituents may be the same or different.

The compounds of this invention are all characterized by having a gem disubstituted norbornyl ring attached directly to a substituted urea or thiourea grouping.

The compounds of the present invention having this norbornyl ring in the molecule are prepared by the following general reactions.

(1) 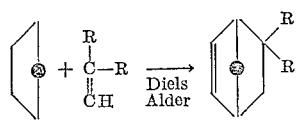

(2) 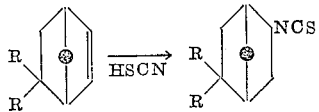

(3) 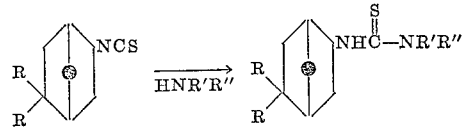

(4) 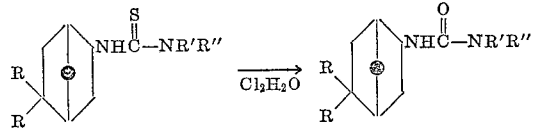

The following compounds are illustrative of the herbicidally active compounds of this invention:

| No. | Compound |
|---|---|
| 1 | 1,1-dimethyl-3-(5-chloro-5-methyl-2-norbornyl)urea. |
| 2 | 1,1-dimethyl-3-(5-chloro-5-methyl-2-norbornyl)-2-thiourea. |
| 3 | 1,1-dimethyl-3-(5-chloro-5-chloromethyl-2-norbornyl)urea. |
| 4 | 1,1-dimethyl-3-(5-chloro-5-chloromethyl-2-norbornyl)-2-thiourea. |
| 5 | 1,1-dimethyl-3-(5,5-bis-(chloromethyl)-2-norbornyl)urea. |
| 6 | 1,1-dimethyl-3-(5,5-bis-(chloromethyl)-2-norbornyl)-2-thiourea. |
| 7 | 1,1-dimethyl-3-(5,5-dichloro-2-norbornyl)urea. |

The following preparations are illustrative of the various methods of preparing the compounds of this invention. All parts and percentages are by weight.

*5-chloro-5-methylnorbornene.*—Two hundred parts of 2-chloro-1-propene, 1 part of hydroquinone, and 120 parts of dicyclopentadiene were mixed and sealed in three Carius tubes. The tubes were heated at 200° C. for 15 hours. The tubes were then cooled and opened. The contents were washed out with benzene and the resulting solution distilled at reduced pressure. A fraction of 80.8 parts of yellow liquid was collected at 80–130° C. at 25 mm. pressure. It analyzed 25.3% Cl compared to a calculated value of 24.9% Cl.

*5-chloro-5-methylnorbornylisothiocyanate.* — To 70 parts of the above 5-chloro-5-methylnorbornene and 75 g. of KSCN in 180 parts of benzene with stirring at 40° C. was added dropwise a solution of 59 parts of concentrated $H_2SO_4$ in 17 parts of water. The mixture was stirred for 6 hours at 30–35° C. and then allowed to stand overnight. The mixture was filtered. The cake was washed with benzene. The filtrate and washings were combined and washed with water and dried over $Na_2SO_4$. The benzene was distilled off at reduced pressure. The unreacted norbornene was distilled off at 50 to 85° C. at 1 mm. (44 parts) leaving a residue of 25.5 parts of viscous yellow liquid which was taken as isothiocyanate.

*1 - (5 - chloro - 5 - methyl norbornyl) - 3,3 - dimethylthiourea.*—To 25.5 parts of the above isothiocyanate in 60 parts of hexane (filtered to remove a small amount of HSCN polymer) was added dimethylamine gas at 5–15° C. to saturate the solution. The precipitate that formed was filtered out, washed with hexane, and dried. 19.3 g. of soft, tan solid, M.P. 65–67° C., was obtained.

*1-(5-chloro-5-methylnorbornyl)-3,3-dimethylurea.*—To a mixture of 16.8 parts of the above thiourea, 115 parts of methylene dichloride, and 40 parts of water was added 14.5 parts of chlorine with stirring over 0.5 hour period. The temperature rose to 38° C. The aqueous layer was separated and poured into 200 parts of water. After standing for about 3 hours, crystals separated. They were filtered out, washed with water, and recrystallized from benzene-hexane mixture. 5.7 parts of white solid, M.P. 164–165° C., was obtained. It analyzed 14.0% Cl and 11.1% N compared to the calculated values of 15.6% Cl and 12.1% N for the formula $C_{11}H_{17}ON_2Cl$.

*5 - chloro - 5-chloromethylnorbornene.*—Two hundred eighty parts of 2,3-dichloropropene-1 and 152 parts of dicyclopentadiene were mixed and sealed in Carius tubes. The tubes were heated at 200° C. for 15 hours. They were opened and the contents removed and distilled at reduced pressure. A fraction of 178.2 parts of water white liquid was collected at 105–128° C. at 20 mm. pressure. It analyzed 37.5% Cl compared to a calculated value of 40.0% Cl.

*5 - chloro-5-chloromethylnorbornylisothiocyanate.*—As described above, 150 parts of 5-chloro-5-chloromethylnorbornene was reacted with 105 g. of KSCN and 85 parts of 98% $H_2SO_4$ in 24 parts of water and 240 parts of benzene. 43.4 parts of viscous yellow liquid product remained after distilling off the unreacted norbornene up to a pot temperature of 80° C. at 0.8 mm. pressure.

*1 - (5 - chloro-5-chloromethylnorbornyl)3,3-dimethylthiourea.*—Thirty-six parts of the isothiocyanate in 50 ml. of benzene was saturated with dimethylamine gas at 10–20° C. The benzene was distilled off at reduced pressure, leaving 38.3 parts of viscous red liquid which cooled to a solid crystalline mass. It analyzed 10.8% S and 22.3% Cl (calculated values are 11.3% S and 25.0% Cl). Thirty parts of this crude thiourea was crystallized from methanol to give 12.8 parts of white crystalline solid, M.P. 138–140° C. It analyzed 24.9% Cl and 9.85% N compared to the calculated values of 25.0% Cl and 9.9% N.

*1 - (5 - chloro-5-chloromethylnorbornyl)-3,3-dimethylurea.*—As above, 9.5 parts of the thiourea in 65 parts of methylene chloride and 25 ml. of water was reacted with 7.2 g. of chlorine. Six parts of white crystalline solid urea, M.P. 208–210° C. was obtained. It analyzed 26.3% Cl and 10.2% N. The calculated values are 26.7% Cl and 10.5% N for the formula $C_{11}H_{16}ON_2Cl_2$.

*5,5 - bis(chloromethyl)norbornene.*—Three hundred twenty parts of dichloroisobutylene and 132 parts of dicyclopentadiene were mixed and sealed in Carius tubes. The tubes were heated at 200° C. for 15 hours. The tubes were opened and the contents distilled at reduced pressure. A fraction of 231 parts of yellow liquid was collected at 80–89° C. at 0.5 mm. pressure. It analyzed 35.3% Cl compared to a calculated value of 37.1% Cl for the structure.

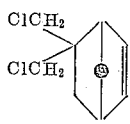

*5,5 - bis(chloromethyl)norbornyl isothiocyanate.*—To 150 parts of 5,5-di(chloromethyl)norbornene and 100 parts of KSCN in 250 parts of benzene at 30° C., was added dropwise with stirring a solution of 79 parts of concentrated $H_2SO_4$ in 23 parts of water. The mixture was stirred at 30° C. for 7 hours and allowed to stand overnight. The reaction mixture was filtered. The cake was washed with benzene. The filtrate and washings were combined, washed with water, and dried over $Na_2SO_4$. The benzene was distilled off at reduced pressure, leaving 148 parts of clear yellow liquid. It analyzed 2.5% N compared to a calculated value of 5.6% N or 44.5% isothiocyanate. 135 parts of this liquid was distilled at reduced pressure to remove unreacted 5,5-di(chloromethyl)norbornene. 63 parts of water-white liquid distilled out at 72–82° C. at 1 mm. pressure (pot temp. 101° C.). A residue of 68 parts of viscous yellow liquid was taken as 5,5-di(chloromethyl)norbornyl isothiocyanate. It analyzed 4.7% N or 84% pure

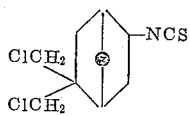

*1,1 - dimethyl - 3 - [5,5 - bis(chloromethyl)norbornyl]thiourea.*—To 58 parts of 5,5-di-(chloromethyl)norbornyl isothiocyanate in a mixture of 160 parts of hexane and 80 parts of benzene was added dimethylamine gas to saturate the solution with cooling at 5–10° C. A yellow precipitate formed. It was filtered out after the mixture stood for one hour at room temperature. It was washed with hexane and dried. 49 parts of cream-colored solid was obtained. It melted at 133–135° C. and analyzed 9.33% N and 10.8% S compared to the calculated values of 9.5% N and 10.8% S for the structure

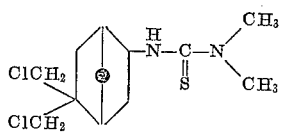

*1,1 - dimethyl - 3 - [(5,5 - dichloromethyl)norbornyl]urea.*—To 30 parts of the above thiourea in 200 parts of methylene chloride was added 100 parts of water followed by 22 parts of chlorine with stirring over a half-hour period. The temperature rose to 38° C. (reflux). The water layer was then separated and diluted with 300 parts of cold water. A precipitate formed and after one hour it was filtered off, washed with water, and dried. 12.8 parts of grey powder was obtained. It was recrystallized from benzene-hexane mixture to give 10.2 parts of cream-colored powder. It melted at 210–213° C. and analyzed 25.2% Cl and 9.6% N compared to the calculated values of 25.3% Cl and 10.0% N for the structure

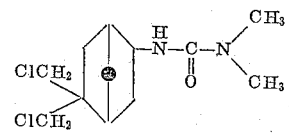

*5,5-dichloronorbornene.*—A mixture of 500 parts of vinylidene chloride, 150 parts of cyclopentadiene, and 2 parts of 4-to-butylcatechol was sealed in glass tubes and heated at 200° C. for 6 hours. The tubes were then opened and the contents distilled at reduced pressure. A fraction of 130.6 parts of water-white liquid was collected at 81–91° C. at 33 mm. pressure. Vapor phase chromatographic analysis of this material indicated 21% dicyclopentadiene present. It was purified by reaction with HSCN to convert the dicyclopentadiene to dicyclopentadienyl isothiocyanate and distillation to give pure 5,5-dichloronorbornene—B.P. 50–55° C. at 1 mm. pressure. It was a white waxy solid at room temperature. VPC analysis indicated a purity of +95%.

*1,1-dimethyl-3-[55-(or 6,6)dichloronorbornyl]urea.* — To 400 parts of conc. $H_2SO_4$ at 0° C. was added dropwise with stirring a solution of 40 parts of 5,5-dichloronorbornene in 8 parts of hexane. Then at 0° C., 25 parts of ethyl thiocyanate was added dropwise with stirring. The reaction mixture was stirred at 0° C. for 7 hours and then stored overnight at 3° C. It was poured into ice water. The brown soft solid that separated was filtered out, washed with cold water, and sucked as dry as possible on the filter. It amounted to 21 parts and was the crude ethyl N-(dichloronorbornyl) thiolcarbamate. It was dissolved in 160 parts of ethanol, 30 parts of 25% aq. dimethylamine was added, and the solution was refluxed until EtSH ceased being evolved (1 hour). The solution was concentrated on the steam bath. The residue with crystals forming in it was diluted with ice water. The precipitate that formed was filtered off, washed with water, and sucked dry. Cream-colored solid amounting to 17.2 parts was obtained. It melted at 240–241° C. when crystallized from ethanol-ethyl acetate mixture. It analyzed 11.2% N and 27.6% Cl compared to the calculated values of 11.15% N and 28.25% Cl for the formula $C_{10}H_{16}ON_2Cl_2$.

Other halogen compounds of this invention are prepared from the corresponding bromo and fluoro compounds analogous to the chlorine compounds shown above.

HERBICIDE EXAMPLES

Testing of the compounds of this invention for selective herbicidal activity was carried out by preparing an aqueous suspension containing 15 g. active compound per liter and spraying at the rate of 80 gallons per acre for a 10 lb. per acre test on young growing plants for the Foliage Spray Test and on soil containing seeds which had been planted 24 hours earlier for the Soil Germination Test. A double spraying was used for 20 lb. per acre test and a proportionately more dilute solution was used for the lower rates. The aqueous suspensions were made by dissolving the compound in acetone to a concentration of 15 g. per 200 cc. acetone solution, adding Tween 20 (a sorbitol monolaurate polyoxyethylene derivative) to a cencentration of 10 g. per 200 cc. of the acetone solution and diluting the acetone solution with water to bring the concentration to 15 g. active compound per liter. The plants and seeds used in these tests were as follows:

| Common Name | Scientific Name |
| --- | --- |
| A—Millet | Setaria sp. |
| B—Corn | Zea mays |
| C—Curled Mustard | Brassica juncea |
| D—Cotton | Gossypium hirsutum |
| E—Tomato | Lycopersicum esculentum |
| F—Marigold | Calendula officinales |

In the tabulations below are given results for exemplary tests. The numerical values are based on a 0–10 rating scale in which 0 means no damage to the plants and 10 indicates complete kill of the plants.

*Foliage spray test*

| | Rate, lb./acre | Compound Number | | | | | | |
| --- | --- | --- | --- | --- | --- | --- | --- | --- |
| | | 1 | 2 | 3 | 4 | 5 | 6 | 7 |
| Millet | 0.5 | 3 | | 10 | | | | 10 |
| | 1.0 | 4 | 4 | 10 | 8 | 8 | 8 | 10 |
| | 2.0 | 9 | | 10 | | | | 10 |
| | 5.0 | | 8 | | 10 | | | |
| Corn | 0.5 | 1 | | 0 | | | | 2 |
| | 1.0 | 3 | 3 | 3 | 2 | 3 | 2 | 5 |
| | 2.0 | 3 | | 9 | | | | 7 |
| | 5.0 | | 5 | | 7 | | | |
| Mustard | 0.5 | 10 | | 10 | | | | 10 |
| | 1.0 | 10 | 10 | 10 | 10 | 10 | 9 | 10 |
| | 2.0 | 10 | | 10 | | | | 10 |
| | 5.0 | | 10 | | 10 | | | |
| Cotton | 0.5 | 8 | | 10 | | | | 10 |
| | 1.0 | 10 | 7 | 10 | 10 | 9 | 3 | 10 |
| | 2.0 | 10 | | 10 | | | | 10 |
| | 5.0 | | 10 | | 10 | | | |
| Tomato | 0.5 | 10 | | 10 | | | | 10 |
| | 1.0 | 10 | 8 | 10 | 10 | 10 | 2 | 10 |
| | 2.0 | 10 | | 10 | | | | 10 |
| | 5.0 | | 10 | | 10 | | | |
| Marigold | 0.5 | 0 | | 10 | | | | 10 |
| | 1.0 | 2 | 2 | 10 | 10 | 6 | 3 | 10 |
| | 2.0 | 5 | | 10 | | | | 10 |
| | 5.0 | | 8 | | 10 | | | |

*Soil germination test*

| | Rate, lb./acre | Compound Number | | | | | | |
| --- | --- | --- | --- | --- | --- | --- | --- | --- |
| | | 1 | 2 | 3 | 4 | 5 | 6 | 7 |
| Millet | 0.5 | 2 | | 10 | | | | |
| | 1.0 | 5 | 0 | 10 | 5 | | | 9 |
| | 2.0 | 8 | | 10 | | 4 | 2 | 9 |
| | 5.0 | | 5 | | 10 | | | |
| Corn | 0.5 | 0 | | 6 | | | | |
| | 1.0 | 1 | 0 | 8 | 0 | | | 1 |
| | 2.0 | 1 | | 9 | | 0 | 0 | 4 |
| | 5.0 | | 0 | | 3 | | | |
| Mustard | 0.5 | 9 | | 10 | | | | |
| | 1.0 | 10 | 6 | 10 | 10 | | | 10 |
| | 2.0 | 10 | | 10 | | 8 | 1 | 10 |
| | 5.0 | | 10 | | 10 | | | |
| Cotton | 0.5 | 0 | | 6 | | | | |
| | 1.0 | 2 | 0 | 10 | 3 | | | 5 |
| | 2.0 | 4 | | 10 | | 0 | 0 | 9 |
| | 5.0 | | 2 | | 9 | | | |

The preferred compounds of this invention are those which contain one halogen in the norbornyl ring and a methyl or halomethyl on the same carbon as in Examples 1–4. The corresponding bromo and fluoro compounds differ only slightly from the chloro compounds in most instances, but in some instances the fluoro compounds show superiority in being less toxic to corn and cotton than the corresponding chloro compound.

The compounds of this invention are used in compositions for use as herbicides in liquid or solid form. Solutions of the compounds, for example, may be used as liquids in solvents such as cyclohexanol, furfural, isobutyl alcohol, cyclohexanone, isopropyl acetate, and acetone and applied directly to the soil in which plants normally grow, or to the plants themselves or to mixtures of seeds of desirable and undesirable plants. The compounds in solid form or solutions thereof in any of the above-mentioned solvents may be admixed with water using a suitable emulsifying agent to form an aqueous emulsion or suspension which is used as the carrier of a herbicide composition. The solid compound or liquid compound with solvent may also be extended by admixing with a solid carrier to form a dust which is used as a herbicidal composition, or the dust may be further extended by mixing with water and a surfactant. Dusts may thus be made from any finely divided solids, preferably those that are readily available and low in price, such as talc, attapulgite, natural clays, pyrophyllite, diatomaceous earth, kaolin, aluminum and magnesium silicates, montmorillonite, and similar substances such as are used as carriers in the insecticide art.

Dusts are commonly produced from a dust former such as talc by blending the active ingredient with talc and further grinding the mixture of active compound and talc with more talc so as to obtain a fluid dust of particle size less than about 50 microns. Fuller's earth is often substituted, and the active ingredient is often applied by spraying an organic solvent solution of the active compound of concentration in the range of 10 to 50%, evaporating the solvent and using the fuller's earth mixture as a concentrate for further blending in the field. Similarly, the clays are often used for the same purpose, and the concentrates are often used for producing suspensions in water which are readily sprayed over the area to be treated, in which case carboxymethylcellulose, methyl cellulose and other carbohydrate gums may be used to aid in maintaining the suspensions.

The preferred herbicidal compositions are those in which water is used as the major component and the compound of this invention is a minor component. Such aqueous dispersions are usually prepared in the field so as to have a content of 0.5 to 10% of the active compound by dispersing a concentrate made up from about 10 to about 90% active compound, about 0.5 to 10% dispersing agent, and 0 to 90% inert diluent. Dispersing agents which are useful in such concentrates are the well-known surface active agents of the anionic, cationic or nonionic type and include alkali metal (sodium or potassium) oleates and similar soaps, amine salts of long chain fatty acids (oleates), sulfonated animal and vegetable oils (fish oils and castor oil), sulfonated petroleum oils, sulfonated acyclic hydrocarbons, sodium salts of lignin sulfonic acids, alkylnaphthalene sodium sulfonates, sodium lauryl sulfonate, disodium monolaurylphosphates, sorbitol laurate, pentaerythritol monostearate, glycerol monostearate, polyethylene oxides, ethylene oxide condensates of stearic acid, stearyl alcohol, stearyl amine, rosin amines, dehydroabietyl amine and the like, lauryl amine salts, dehydroabietyl amine salts, lauryl pyridinium bromide, stearyl trimethyl ammonium bromide, and cetyl dimethylbenzylammonium chloride. The aqueous dispersion may thus be made from the compounds themselves, from the compounds dissolved in water-soluble or water-insoluble solvent or from wettable dusts.

The herbicidal compositions are applied as a spray or as a dust to the seeds, plants, or soil in which the undesired plants normally grow. The treatment may be carried out by treatment before seeds sprout, after plant life has started or to the locus or area where plant growth is anticipated in advance of their emergence.

The active ingredients of the compositions are applied in an amount sufficient to exert the desired herbicidal action. This amount will vary with the time of treatment, stage of growth of both desirable plants which will simultaneously receive treatment and undesired plants or weeds. Where it is desired to selectively control the growth of plants in an area of mixed vegetation, the amount will be carefully determined so as to obtain the desired result which must be determined by experiment on the particular combination of plant life present. Where complete sterilization of the soil is desired, sufficient material is used to kill the most resistant plants. For selective control the rate of application will be from about 1 to 30 pounds per acre of the active compound of this invention. For complete sterilization where highly resistant plants are absent, applications as low as 20 pounds per acre may be used, and the rate may be extended to 50 pounds per acre in the case of highly resistant plants.

From the above data it will be appreciated that many variations in amounts of active compound to be used and modes of application are possible and will be obvious to those skilled in the art. The detailed description is thus given only to indicate the scope of the invention and no unnecessary limitation should be interpreted therefrom.

This application is a continuation-in-part of copending application Serial No. 75,917, filed December 15, 1960, as a continuation-in-part of application Serial No. 5,670, filed February 1, 1960, now abandoned.

What we claim and desire to protect by Letters Patent is:

1. A herbicidally active composition of matter represented by the formula

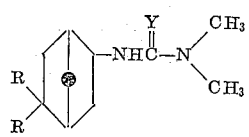

in which the R substituents on the norbornyl ring represent radicals selected from the group consisting of methyl, halogen, and halomethyl, where the halogen has an atomic number not greater than 35 and Y is selected from the group consisting of oxygen and sulfur.

2.

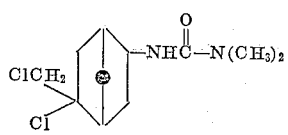

3.

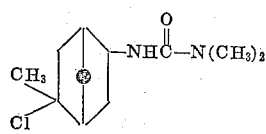

4.

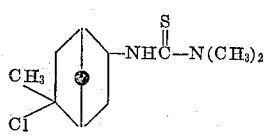

5.

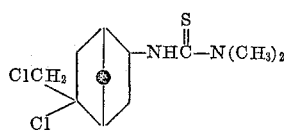

6.

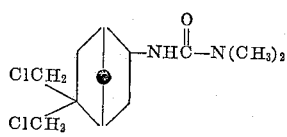

7.

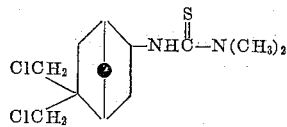

8.

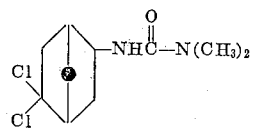

9. A composition for destroying undesired plants comprising a major amount of a herbicide carrier material and a minor amount of a compound of claim 1.

10. A composition for destroying undesired plants comprising a major amount of a herbicide carrier material and a minor amount of a compound of claim 2.

11. A composition for destroying undesired plants comprising a major amount of a herbicide carrier material and a minor amount of a compound of claim 3.

12. A composition for destroying undesired plants comprising a major amount of a herbicide carrier material and a minor amount of a compound of claim 4.

13. A composition for destroying undesired plants comprising a major amount of a herbicide carrier material and a minor amount of a compound of claim 5.

14. A composition for destroying undesired plants comprising a major amount of a herbicide carrier material and a minor amount of a compound of claim 6.

15. A composition for destroying undesired plants comprising a major amount of a herbicide carrier material and a minor amount of a compound of claim 7.

16. A composition for destroying undesired plants comprising a major amount of a herbicide carrier material and a minor amount of a compound of claim 8.

References Cited in the file of this patent
UNITED STATES PATENTS

| | | |
|---|---|---|
| 2,709,648 | Ryker et al. | May 31, 1955 |
| 2,726,263 | Audrieth et al. | Dec. 6, 1955 |
| 2,967,101 | Hamm et al. | Jan. 3, 1961 |
| 3,033,901 | Song | May 8, 1962 |

UNITED STATES PATENT OFFICE
CERTIFICATE OF CORRECTION

Patent No. 3,174,843　　　　　　　　　　　　　　　　March 23, 1965

George A. Buntin et al.

It is hereby certified that error appears in the above numbered patent requiring correction and that the said Letters Patent should read as corrected below.

Column 1, lines 32 to 36, the formula should appear as shown below instead of as in the patent:

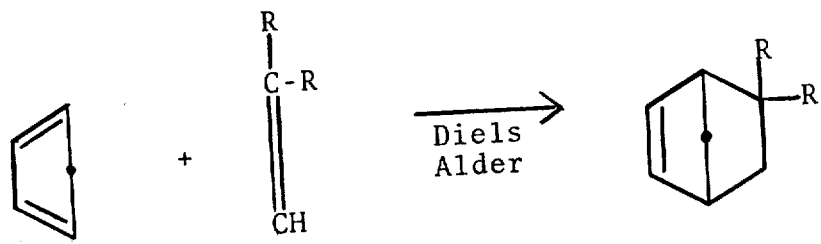

column 4, line 17, for "4-to-butylcatechol" read -- 4-t-butylcatechol --.

Signed and sealed this 17th day of August 1965.

(SEAL)
Attest:

ERNEST W. SWIDER
Attesting Officer

EDWARD J. BRENNER
Commissioner of Patents